Sept. 27, 1955     R. A. NORBOM     2,718,933
ROTARY SEPARATOR
Filed March 31, 1952
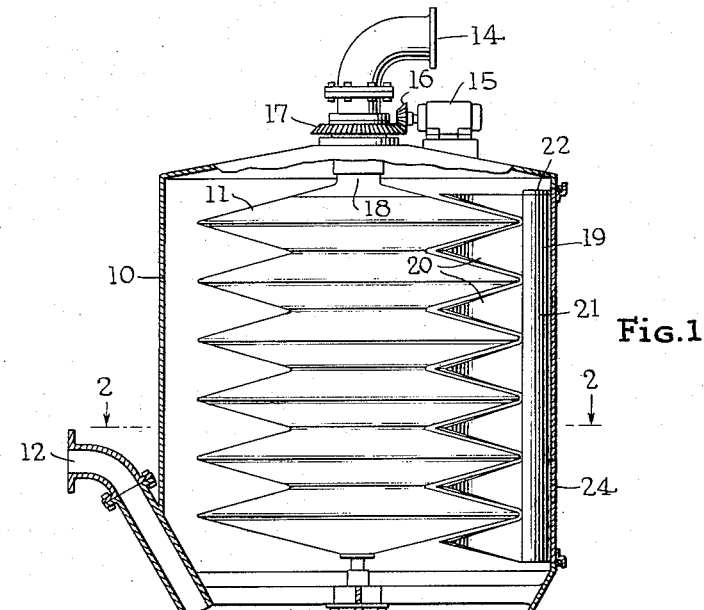
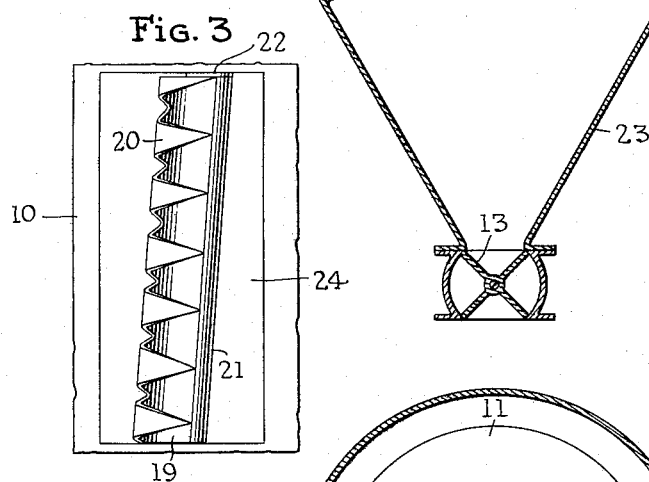
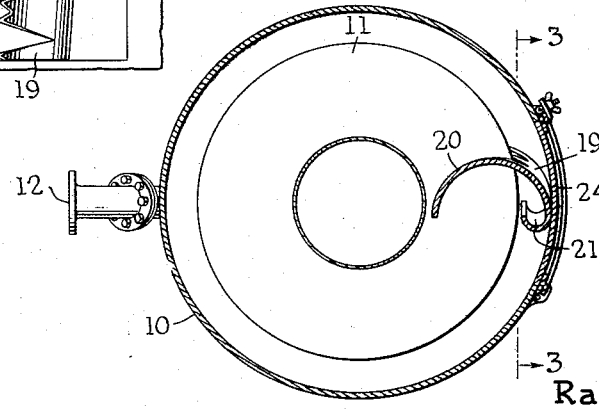
INVENTOR.
Ragnar A. Norbom
BY
Attorney

United States Patent Office 2,718,933
Patented Sept. 27, 1955

2,718,933

ROTARY SEPARATOR

Ragnar A. Norbom, Alexandria, Va., assignor of one-half to Benjamin F. Fitch and one-half to Lucille Fitch, both of Newport, R. I.

Application March 31, 1952, Serial No. 279,676

3 Claims. (Cl. 183—63)

This invention relates to filters for pulverulent material such, for example, as flour.

Whenever flour is being transported pneumatically as, for example, to or from a railroad car or storage bin, it is a serious problem to keep the flour particles from entering the air suction pump. The latter, of course, provides the necessary moving current of air for the transport of the flour.

Although the machine could be used for filtering almost any material of this general character, the description herein will have reference primarily to flour.

It is an object of this invention to provide an efficient filter for this purpose which may be continuously operated without clogging.

It is a further object of this invention to provide a filter of the rotating cloth bag type which will handle large volumes of flour or other pulverulent material in a continuous fashion.

Other objects and advantages of the apparatus of this invention will be readily comprehended from the following description read in connection with the attached sheet of drawings, in which, Figure 1 shows a view partially in section of the complete apparatus, Figure 2 is a section on line 2—2 of Figure 1, and, Figure 3 is a perspective view of the baffle member as seen when looking in the direction as indicated at 3—3 in Figure 2, and with the filter element removed.

Rotating cloth bag filters have been used heretofore. An example of a device of this general type may be found in the U. S. patent to Glassford, No. 772,507 of 1904. It has been discovered that in the use of apparatus of this type, continued use causes a build-up of flour particles on the filter bag which results in greatly decreased efficiency due to a reduction in effective filter area, and a larger pressure drop across the filter element. The above mentioned patent to Glassford makes use of a pair of cam actuated striker mechanisms which jar the rotating filter cloth periodically.' The disadvantages of such a construction are obvious, as continuous jarring of a rotating mechanism is bound to prove detrimental in the long run.

It has been discovered that the accumulation of flour particles on the rotating filter cloth is due primarily to a cloud-like build-up of flour particles circulating with the rotating filter cloth. On prolonged continuous operation, this cloud gradually increases in density to a point where the particles tend to precipitate or drop on to the filter element itself. By providing a baffle means effective to prevent the build-up of this rotating cloud of flour particles, it has been found that the filter may be continuously and efficiently operated over greatly increased periods of time without shutdown.

Referring now to the attached sheet of drawings, the apparatus includes basically a casing 10 in which is mounted a rotary cloth filter 11. The casing is provided with a material inlet 12 at one side thereof and with a rotary dump valve 13 located at the base or lower portion of the casing. The moving current of air heavily laden with flour passes into the filter casing, where the flour is caused to drop to the bottom of the casing. The air stream then passes through the rotary cloth filter and on to the suction pump (not shown) through the outlet 14. Any convenient means for rotating the cloth filter may be used and in the drawing an electric motor 15 is shown operating through a pair of gears 16 and 17. The former is affixed to the shaft of the motor and the latter is attached to the shaft 18 on which the filter element is mounted.

The filter element 11 is made of a cloth such as nylon and is formed into a generally cylindrical member with a plurality of accordion-like pleats on its outer periphery. The structural details of this construction form no part of the present invention and hence are not shown. It will be appreciated, however, that the structure shown presents a maximum of filter surface to the material to be filtered.

In order to prevent the aforementioned cloud build-up, a baffle member 19 is mounted on a side wall of the casing 10. The baffle is shown most clearly in the perspective view of Figure 3 and includes a plurality of fingers 20 each tapered to substantally a point, and extending radially inwardly from the side wall of the casing. The fingers are located intermediate adjoining pleats of the filter element much in the manner of a pair of gears which are not quite in mesh. The casing side of the baffle member includes an open-sided conduit 21 as best shown in Figure 2. This conduit is closed at its upper end by a cap member 22.

The lower portion 23 of the casing 10 is tapered as shown in Figure 1 and terminates in a housing for the dump valve 13. The reason for having a dump valve instead of an open device such as a screw conveyor will be apparent from the following description of the operation of this apparatus.

As best shown in Figure 2, a door 24 is provided in the cylindrical portion of the casing 10. This door is substantially co-extensive in height with the cylindrical portion of the casing and with the baffle member, and the baffle member is supported by the door. This structure provides, therefore, a means for ready access to the filter element and the baffle element for cleaning or other purposes.

In operation, the apparatus of this invention is connected intermediate the suction pump and the conduit leading from the supply of flour to be moved. As a practical matter and assuming that flour is being pneumatically unloaded from a railroad car and conveyed to a large storage bin, the apparatus of this invention would be placed above the bin so that the rotary dump valve may serve to discharge flour directly into the bin. With the motor 15 energized, the filter element 11 is rotated and the air stream carrying the flour is led through the inlet conduit 12 from which it enters into the interior of the casing 10. Due to the current of air moving through the casing, some of the flour particles tend to be drawn up toward the rotating filter element. This initial movement is followed by a tendency of such particles to rotate in a whirling air stream which surrounds the filter element in a cloud of ever increasing density. The presence, however, of the baffle member 19 serves to prevent this cloud particle build-up and forces the flour particles into the conduit portion 21 where they fall downwardly out the bottom of the conduit and into the conical portion of the casing 10. The dump valve 13 while permitting discharge of the flour into whatever storage or transport receptacle is desired, also maintains an airtight seal at all times to prevent the intake of air into the casing at this point. Obviously, operation of this valve may be either manual or automatic.

I claim:

1. A rotary separator for pulverulent material comprising: an outer casing; a cloth bag filter element having the shape of a pleated hollow cylinder and supported for rotation within said casing; power means for rotating said filter element; conduit means for connection to a suction source, said means extending through a wall of said casing and communicating with the interior of said filter; inlet means extending through a wall of said casing and communicating with the interior thereof; valved outlet means in the bottom of said casing for removal of solid material rejected by said filter; baffle means mounted on a side wall of said casing, said baffle means including a plurality of tapered fingers extending radially inwardly from said side wall and occupying a position intermediate but out of contact with the adjacent pleats of said filter adjacent the periphery thereof; a door in said casing, positioned adjacent and being substantially co-extensive in vertical height with said filter element; and means supporting the baffle means on the inner side of said door.

2. A rotary separator for pulverulent material comprising: an outer casing; a cloth bag filter element having the shape of a pleated hollow cylinder and supported for rotation within said casing; power means for rotating said filter element; conduit means for connection to a suction source, said means extending through a wall of said casing and communicating with the interior of said filter; inlet means extending through a wall of said casing and communicating with the interior thereof; valved outlet means in the bottom of said casing for removal of solid material rejected by said filter; and baffle means mounted on a side wall of said casing, said baffle means including a plurality of tapered fingers extending radially inwardly from said side wall and occupying a position intermediate but out of contact with the adjacent pleats of said filter adjacent the periphery thereof, the said baffle means including an open-sided conduit extending substantially from top to bottom thereof, closed at the top and open at the bottom, said conduit serving to catch and deflect downwardly, solid material rejected by said filter and thrown outwardly due to centrifugal action.

3. A rotary separator for pulverulent material comprising: a circular casing including an upper cylindrical portion and a lower conical portion; a filter element comprising a cloth bag shaped to form a hollow pleated cylinder and supported for rotation within the cylindrical portion of said casing; power means mounted externally on said casing for rotating said filter element; first conduit means for connection to a suction source, said means extending through the upper wall of said casing, and communicating with the interior of said filter element; second conduit means extending through the side of said casing to a point in the lower conical portion thereof affording an inlet for material to be filtered; a rotary dump valve mounted at the apex of the lower conical portion of said casing affording an outlet for solid material rejected by said filter element; a door in the cylindrical portion of said casing, extending from top to bottom thereof; and a baffle member mounted on said door in angular relation thereto, said baffle member including a plurality of tapered curled fingers extending radially inwardly from said door, occupying a position intermediate but out of contact with the adjacent pleats of said filter element adjacent the periphery thereof, and an open-sided conduit extending from top to bottom thereof, closed at its top and open at its bottom, said baffle serving to break up circulating dust clouds, which otherwise tend to follow the rotating filter element, and to deflect the particles thrown outwardly by centrifugal force into the conduit portion of the baffle where they will fall to the lower portion of the casing.

References Cited in the file of this patent

UNITED STATES PATENTS

| | | |
|---|---|---|
| 267,467 | Smith | Nov. 14, 1882 |
| 772,507 | Glassford | Oct. 18, 1904 |
| 1,444,092 | Anderson | Feb. 6, 1923 |
| 2,398,233 | Lincoln | Apr. 9, 1946 |
| 2,575,876 | Kausch | Nov. 20, 1951 |

FOREIGN PATENTS

| | | |
|---|---|---|
| 856,275 | France | Mar. 18, 1940 |